United States Patent [19]

Sekiguchi

[11] Patent Number: 5,725,286
[45] Date of Patent: Mar. 10, 1998

[54] ANTILOCK LIQUID-PRESSURE CONTROL APPARATUS

[75] Inventor: Akihiko Sekiguchi, Saitama, Japan

[73] Assignee: Akebono Brake Industry Co., Ltd., Tokyo, Japan

[21] Appl. No.: 694,702

[22] Filed: Aug. 9, 1996

[30] Foreign Application Priority Data

Aug. 9, 1995 [JP] Japan ................... 7-203111

[51] Int. Cl.$^6$ ................................ B60T 8/32
[52] U.S. Cl. ................... 303/115.4; 303/116.1
[58] Field of Search ........... 303/116.1, 116.2, 303/116.3, 116.4, 115.1, 115.3, 115.4, 115.5, 68, 61, 117.1, 119.1, 900, 901, 84.1, 84.2

[56] References Cited

U.S. PATENT DOCUMENTS

| | | | |
|---|---|---|---|
| 3,666,328 | 5/1972 | Williams | 303/115.5 |
| 3,722,960 | 3/1973 | Menar | 303/115.4 |
| 3,774,976 | 11/1973 | Parsons | 303/115.5 |
| 3,877,758 | 4/1975 | Kuwana | 303/61 |
| 3,936,095 | 2/1976 | Every | 303/115.4 |
| 4,017,126 | 4/1977 | Ohta | 303/115.4 |
| 4,350,396 | 9/1982 | Mortimer | 303/115.4 |
| 4,492,413 | 1/1985 | Belart et al. | 303/115.4 |
| 4,765,692 | 8/1988 | Miyake | 303/115.4 |
| 4,865,398 | 9/1989 | Takeuchi et al. | 303/115.1 |
| 4,892,362 | 1/1990 | Takata | 303/115.4 |
| 5,131,729 | 7/1992 | Wetzel | 303/115.4 |
| 5,290,098 | 3/1994 | Burgdorf et al. | 303/115.4 |
| 5,322,363 | 6/1994 | Sekiguchi et al. | 303/115.4 |
| 5,330,258 | 7/1994 | Hoshoya et al. | 303/115.4 |
| 5,462,343 | 10/1995 | Yoshida et al. | 303/119.1 |
| 5,509,729 | 4/1996 | Zaviska et al. | 303/115.4 |
| 5,518,306 | 5/1996 | McCann et al. | 303/116.1 |
| 5,590,936 | 1/1997 | Reuter | 303/116.1 |

FOREIGN PATENT DOCUMENTS

| | | | |
|---|---|---|---|
| 3203563 | 8/1983 | Germany | 303/115.4 |
| 0005467 | 10/1986 | Japan . | |
| 62-37256 | 2/1987 | Japan | 303/115.5 |
| 63-8057 | 1/1988 | Japan | 303/61 |
| 63-297156 | 12/1988 | Japan | 303/115.4 |
| 2200177 | 7/1988 | United Kingdom | 303/115.4 |

*Primary Examiner*—Douglas C. Butler
*Attorney, Agent, or Firm*—Morgan, Lewis & Bockius LLP

[57] ABSTRACT

An antilock liquid-pressure control apparatus includes a first liquid-pressure control mechanism and a second liquid-pressure control mechanism. A second liquid chamber in the first liquid-pressure control mechanism is communicatively connected to a wheel cylinder, and through a check valve to a pressure chamber of a master cylinder. A first liquid chamber in the first liquid-pressure control mechanism is communicatively connected to a discharge port of a liquid pressure pump and a liquid chamber in the second liquid-pressure control mechanism, through a flow control valve, and further to a reservoir through a decay valve. A spring container in the second liquid-pressure control mechanism communicates with the pressure chamber of the master cylinder. In a pressure reduction mode of the antilock control, the brake liquid is sucked from the first liquid chamber by the liquid pressure pump, and the sucked brake liquid is accumulatively pressurized in the liquid chamber of the record control mechanism, and the brake liquid is returned from the spring container to the master cylinder. In a pressure reapplication mode of the antilock control, the brake liquid is supplied from the liquid chamber of the record control mechanism to the first liquid chamber, through the flow control valve.

3 Claims, 3 Drawing Sheets

ANTILOCK LIQUID-PRESSURE CONTROL APPARATUS

BACKGROUND OF THE INVENTION

1. Field of the Invention

The present invention relates to an antilock liquid-pressure control apparatus, and more particularly to an antilock liquid-pressure control apparatus of the volume variable type which is small in else and low in cost, and does not need, for its construction, a high pressure accumulator, a pressure switch, a large-size reservoir tank, and the like.

2. Discussion of the Prior Art

There is known an antilock liquid-pressure control apparatus of the called volume variable type. An example of the antilock liquid-pressure control apparatus of this type is disclosed in Japanese Utility Model Publication No. Hei. 5-467. In the liquid-pressure control apparatus disclosed, a cut valve is provided at the midway in a main liquid path, which interconnects a master cylinder and a wheel cylinder. The cut valve is provided for cutting off the main liquid path. A liquid pressure control housing is located closer to the wheel cylinder than to the cut valve. A liquid-pressure control piston is slidably provided in the liquid pressure control housing. The inner space of the liquid pressure control housing is partitioned into a first liquid chamber and a second liquid chamber by the liquid-pressure control piston. The first liquid chamber communicates with the wheel cylinder and the cut valve, and the second liquid chamber is isolated from the first liquid chamber. A liquid pressure in the wheel cylinder is controlled so as to put a slip factor of the wheel within a proper range. To such a control of the liquid pressure, the liquid-pressure control piston is moved forward and backward by increasing or decreasing the liquid pressure in the second liquid chamber under control of an electromagnetic liquid-pressure control valve.

In the antilock liquid-pressure control apparatus of the volume variable type as described above, a high pressure accumulator and a pressure switch for monitoring a pressure in the accumulator are indispensably used. Additionally, a large size reservoir tank for holding brake oil must be provided in an antilock liquid-pressure control circuit, This results in increase of the size and weight of the apparatus. Further, two control electromagnetic valves, a hold valve and a decay valve, must be used for one brake piping system. The accumulator and the pressure switch are expensive, leading to increase of the cost to manufacture the apparatus.

SUMMARY OF THE INVENTION

An object of the present invention is to provide a novel antilock liquid-pressure control apparatus which may be constructed not using the high pressure accumulator, the pressure swatch, and the large else reservoir tank, and using a single control electromagnetic valve, and gently reapplies a pressure to the brake at a stable and fixed pressure gradient in a pressure reapplication mode of the antilock control. When the antilock liquid-pressure control apparatus of the invention is assembled into a vehicle, the vehicle weight can be reduced.

According to the present invention, there is provided an antilock liquid-pressure control apparatus comprising: a first liquid-pressure control mechanism, the inner space thereof being partitioned into a first liquid chamber and a second liquid chamber by a piston; a second liquid-pressure control mechanism, the inner space thereof being partitioned into a liquid chamber and a spring container by a piston; wherein the second liquid chamber in the first liquid-pressure control mechanism is communicatively connected to a wheel cylinder and a pressure chamber of a master cylinder through a valve mechanism which closes a flow path only when the antilock control is executed, the first liquid chamber in the first liquid-pressure control mechanism is communicatively connected to a discharge port of a liquid pressure pump and a liquid chamber in the second liquid-pressure control mechanism through a flow control valve and further to a reservoir through a decay valve, the spring container in the second liquid-pressure control mechanism communicates with the pressure chamber of the master cylinder, and wherein in a pressure reduction mode of the antilock control, the brake liquid is sucked from the first liquid chamber by a liquid pressure pump, and the sucked brake liquid is accumulatively pressurized in the liquid chamber, and the brake liquid is returned from the spring container to the master cylinder, and in a pressure reapplication mode of the antilock control, the brake liquid is supplied from the liquid chamber to the first liquid chamber, through the flow control valve.

DETAILED DESCRIPTION OF THE PREFERRED EMBODIMENTS

The preferred embodiment of the present invention will be described with reference to the accompanying drawings.

Figure 1:
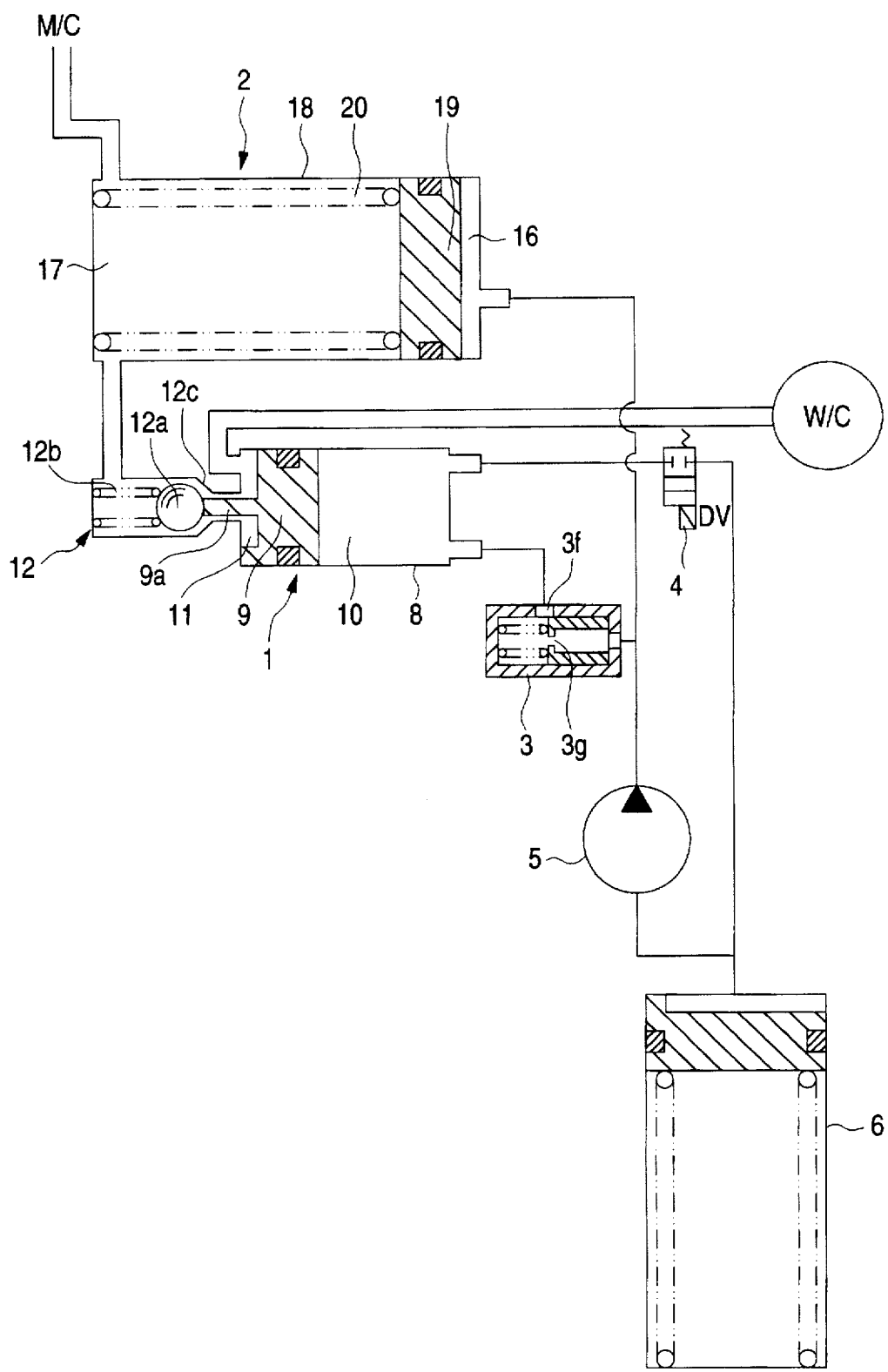
FIG. 1 is a diagram schematically showing an antilock liquid-pressure control apparatus according to an embodiment of the present invention.

FIG. 1 is a diagram schematically showing an antilook liquid-pressure control apparatus according to an embodiment of the present invention. A brake piping system connecting a master cylinder to one wheel cylinder is typically illustrated in the figure. The brake piping systems for other wheel cylinders are also arranged in a similar way. The speed sensors, the electronic control system fox controlling the valves, and the like may be the conventional ones, and hence those are omitted in the illustration.

In the figure, reference numeral 1 designates a first liquid-pressure control mechanism (to be described in detail later); 2, a second liquid-pressure control mechanism (to be described in detail later); 3, a flow control valve; 4, a decay valve; 5, a liquid pressure pump; 6, a reservoir; and W/C, a wheel cylinder. Those mechanisms and components other than the decay valve, the liquid pressure pump, and the reservoir are all known.

In the first liquid-pressure control mechanism 1, a piston 9 is slidably inserted into a cylinder 8, which is formed within a liquid pressure control housing. The inner space in the cylinder 8 is partitioned into a first liquid chamber 10 and a second liquid chamber 11. The first liquid chamber 10 is communicatively connected to the flow control valve 3 and the decay valve 4. The flow control valve 3 is communicatively connected to a discharge port of the liquid pressure pump 5 and a liquid chamber 16 (to be described later) of the second liquid-pressure control mechanism 2.

The decay valve 4 is communicatively connected to a suction port of the liquid pressure pump 5 and the reservoir 6, as shown. The second liquid chamber 11 of the first liquid-pressure control mechanism 1, as shown, is communicatively connected to the wheel cylinder W/C and further to a spring container 17 of the second liquid-pressure control mechanism 2 by way of a check valve 12 as a valve mechanism.

The check valve 12 comprises a ball 12a, a valve rod 9a of the piston in the first liquid-pressure control mechanism, a spring 12b, and a valve seat 12c. In a normal state (shown in FIG. 1), a liquid pressure in the first liquid chamber 10 impels the valve rod 9a to push the ball 12a while resisting an urging force of the spring 12b. In this state, the second liquid chamber 11 communicates with the spring container 17 in the second liquid-pressure control mechanism 2. When the piston 9 of the first liquid-pressure control mechanism 1 is moved toward the first liquid chamber 10, the ball 12a of the check valve 12 is brought into contact with the valve seat 12c, so that the spring container 17 in the second liquid-pressure control mechanism 2 is cut off from the second liquid chamber 11 in the first liquid-pressure control mechanism 1.

Figure 2:
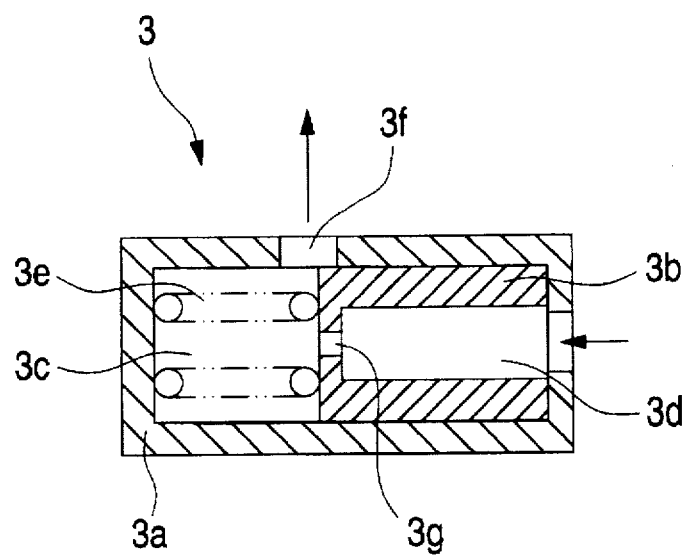
FIG. 2 is a cross sectional view showing a states of a flow control valve when it is in a nonoperating state.

The flow control valve 3 supplies a pressure liquid from the second liquid-pressure control mechanism and the liquid pressure pump to the first liquid chamber always at a fixed pressure gradient when pressure is reapplied in an antilock control. The flow control valve 3 having such a function ensures an exact reapplication of pressure when the antilock control is performed. The flow control valve 3 is illustrated in detail in FIG. 2. As shown, the flow control valve 3 comprises a sleeve 3a, a valve body 3b slidably provided in the sleeve 3a, a spring chamber 3c and a liquid chamber 3d that are partitioned by the valve body 3b within the sleeve 3a, and a spring 3e, located in the spring chamber 3c, for urging the valve body 3b as illustrated. The sleeve 3a has a side port 3f formed therein, an opening area of which is reduced with the movement amount of the valve body 3b. The valve body 3b has an orifice 3g formed therein. In a state of the flow control valve 3 as shown in FIGS. 1 and 2, the first liquid chamber 10 in the first liquid-pressure control mechanism 1 communicates with the discharge port of the liquid pressure pump 5 and the liquid chamber 16 in the second liquid-pressure control mechanism 2 by way of a route of the side poet 3f—spring chamber 3c—orifice 3g (of the valve body)—liquid chamber 3d in the flow control valve 3.

In the second liquid-pressure control mechanism 2, a piston 19 is slidably provided in a cylinder 18 formed within the liquid pressure control housing. The piston 19 partitions the space within the cylinder 18 into a liquid chamber 16 and the spring container 17. A spring 30 is located within the spring container 17. The container 17 is communicatively connected to the check valve 12 and a pressure chamber of a master cylinder. The liquid chamber 16, as already referred to, is communicatively connected to the flow control valve 3 and the discharge port of the liquid pressure pump 5. The piston 19 in the second liquid-pressure control mechanism 2 is constantly urged to the right by the spring 20 in the spring container 17, as shown.

The suction port of the liquid pressure pump 5 is connected to the decay valve 4 and the reservoir 6. In the antilock control, the liquid pressure pump 5 operates to suck a brake liquid from the reservoir 6 or the first liquid chamber 10 of the first liquid-pressure control mechanism 1, through the decay valve 4 being opened. The operation of the liquid pressure pump 5 and the opening/closing timings of the decay valve 4 in the antilock control are known and not essential to the present invention, and hence no further description thereof will be given.

The operation of the antilock liquid-pressure control apparatus thus constructed will be described.

Normal Braking Mode

The first and second liquid-pressure control mechanisms 1 and 2 maintain their states as illustrated. Accordingly, the check valve 12 is opened. The second liquid chamber 11 of the first liquid-pressure control mechanism 1 communicates with the spring container 17 of the second liquid-pressure control mechanism 2. The spring container 17 communicates with the pressure chamber of the master cylinder. Then, the pressure chamber of the master cylinder communicates with the spring container 17—check valve 12—second liquid chamber 11—the wheel cylinder W/C. Also in this state, the first liquid chamber 10 of the first liquid-pressure control mechanism 1 is filled with the brake liquid pressurized at a predetermined pressure. When the brake pedal is depressed, a brake liquid pressure is generated in the pressure chamber of the master cylinder. The brake liquid pressure generated is transmitted to the wheel cylinder W/C by way of a route of the spring container 17—check valve 12—second liquid chamber 11, and the related wheel is braked.

When the brake is released, the brake liquid is returned to the master cylinder through the reverse route, from the related wheel cylinder.

Antilock Control

Pressure Reduction

When the wheel is locked during the braking operation, a sensor, not shown, senses a lock of the wheel, and a related electronic control unit opens the decay valve 4 in the brake piping system and operates the liquid pressure pump 5.

Then, the brake liquid in the first liquid chamber 10 partitioned by the piston 9 in the first liquid-pressure control mechanism 1, flows into the reservoir 6 through the decay valve 4 being opened. The piston 9 in the mechanism 1 is moved toward the first liquid chamber 10 by the liquid pressure applied from the wheel cylinder. With the movement of the piston, the ball 12a comes in contact with the valve seat 12c, to thereby close the check valve 12. Thereafter, the brake liquid flows from the wheel cylinder into the second liquid chamber 11 of the first liquid-pressure control mechanism 1. The piston 9 moves to the right in the drawing, while the second liquid chamber 11 increases its volume, and the brake pressure to the wheel is reduced.

At substantially the Fame time, the liquid pressure pump 5 operates to suck the brake liquid from the reservoir 6, and discharges the brake liquid into the liquid chamber 16 partitioned by the piston 19 in the second liquid-pressure control mechanism 2. As the result of the inflow of the brake liquid into the liquid chamber 16, the piston 19 in the second liquid-pressure control mechanism 2 moves while resisting the urging force of the spring 20, to thereby cause the brake liquid to flow from the spring container 17 into the pressure chamber of the master cylinder. Thus, in the antilock control, the pressure in the wheel cylinder is reduced through the increase of the volume of the second liquid chamber 11, which ensues from the movement of the piston 9 in the first liquid-pressure control mechanism 1.

In the pressure reduction mode of the antilock control, part of the brake liquid that is discharged from the liquid pressure pump 5 returns to the first liquid chamber 10 in the first liquid-pressure control mechanism 1, through the orifice 3g and the side port 3f. In this case, the amount of the brake liquid flowed out of the decay valve 4 is larger than that of the brake liquid from the pump. Accordingly, the brake liquid from the pump little affects the pressure reduction operation. Further, the amount of the brake liquid flowing into the first liquid chamber 10 is restricted by the orifice 3g, so that the amount of the brake liquid fed to the liquid chamber 16 in the second liquid-pressure control mechanism 2 is little varied.

Pressure Reapplication

In the pressure reapplication mode of the antilock control, a command Is issued from the electronic control unit, not shown, to the decay valve 4, to thereby close the valve. At this time, the liquid pressure pump 5 still continues its operation. Accordingly, the liquid pressure pump 5 is idling and its discharge pressure drops. As a result, the liquid pressure in the pressure chamber of the master cylinder and the urging force of the spring 20 in the second liquid-pressure control mechanism 2 cooperate to push the piston 19 in the mechanism 2 toward the liquid chamber 16. The brake liquid that has reached the liquid chamber 16 is caused to flow into the first liquid chamber 10 in the first liquid-pressure control mechanism 1 through the orifice 3g and the side port 3f in the flow control valve 3. In turn, the piston 9 in the first liquid-pressure control mechanism I moves toward the second liquid chamber 11. In this way, the brake liquid is returned from the second liquid chamber 11 to the wheel cylinder of the master cylinder, to thereby perform the reapplication of pressure.

Figure 3:
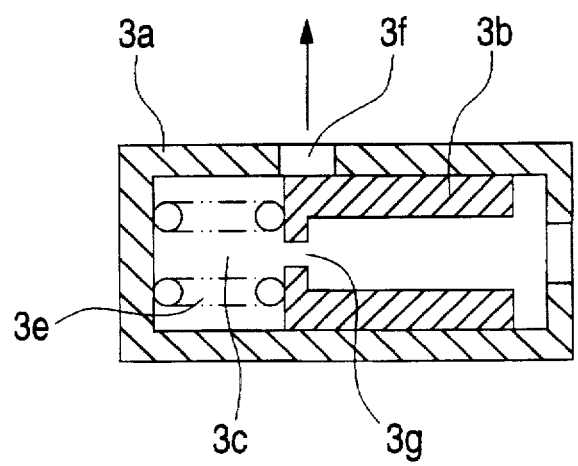
FIG. 3 is a cross sectional view showing a states of a flow control valve when it is in a nonoperating state.

When the pressure is reapplied to the brake, the valve body 3b of the flow control valve 3 is put in a state as shown in FIG. 3. In this state, the area of the opening of the side port 3f, which is formed in the sleeve 3a of the flow control valve 3, is reduced. The brake liquid, which has reached the second liquid chamber 11 in the second liquid-pressure control mechanism 2, is supplied to the first liquid chamber 10 in the first liquid-pressure control mechanism 1 in a state that the flow rate of the brake liquid is reduced by the orifice 3g and the side port 3f. Consequently, the pressure is gently applied again to the brake. In the pressure reapplication mode, if the pressure in the liquid chamber 16 in the second liquid-pressure control mechanism 2 is high, the valve body 3b of the flow control valve 3 greatly moves to further reduce the area of the opening of the side port 3f. If the pressure in the liquid chamber 16 is low, the area of the opening of the side port 3f is reduced to a smaller extent. Thus, a fixed amount of the brake liquid may be supplied to the first liquid chamber of the first liquid-pressure control mechanism independently of the liquid pressure in the liquid chamber 16 in the second liquid-pressure control mechanism 2. Therefore, the pressure reapplication can be carried out in a constant and stable state. The pressure gradient may be varied by properly selecting the strength of the spring chamber 3c or the area of the flow path of the orifice 3g in the stage of design.

Figure 4:
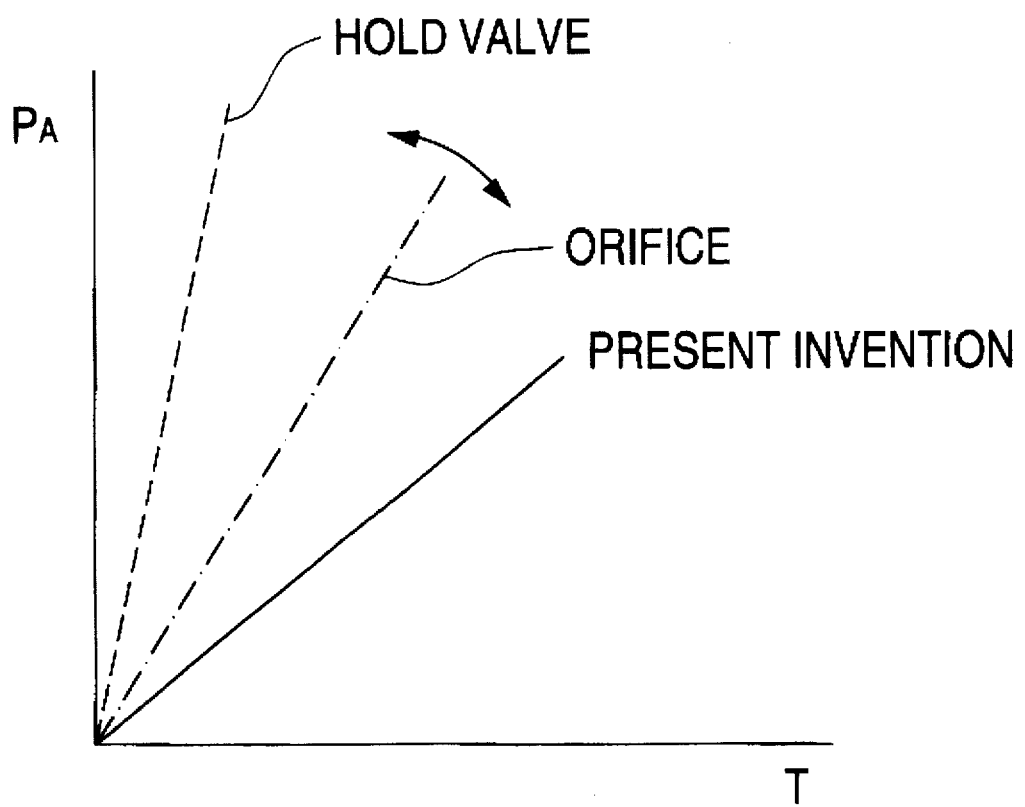
FIG. 4 is a graph useful in explaining the pressure gradients in the reapplication of pressure when a hold valve, an orifice and a flow control valve of the invention are used.

The operation will further be described with reference to FIG. 4. Where the conventional hold valve is used instead of the flow control valve, the hold valve is rapidly opened in the pressure reapplication mode, so that the pressure gradient is large. In this circumstance, it is difficult to secure a high precision control of the pressure reapplication. The orifice maybe used instead of the flow control valve. In this case, the pressure in the liquid chamber in the second liquid-pressure control mechanism makes the pressure gradient sharp as shown in FIG. 4. The use of the orifice is inadequate to the accurate control of the pressure reapplication. In the embodiment of the invention using the flow control valve, the pressure gradient can be gentle and fixed independently of the liquid pressure in the liquid chamber 16 in the second liquid-pressure control mechanism 2, to thereby ensure an accurate control of the pressure reapplication.

In the pressure reapplication mode, the piston in the first liquid-pressure control mechanism is not fully moved to the second liquid chamber. Accordingly, the check valve remains closed, and no brake liquid flows into the master cylinder, from the wheel cylinder.

Thus, the embodiment described above can precisely control the pressure of the brake liquid by varying the volumes of the first and second liquid chambers in the first liquid-pressure control mechanism through the operations of the first and second liquid-pressure control mechanisms.

In the embodiment shown in FIG. 1, the second liquid chamber 11 in the first liquid-pressure control mechanism 1 is communicatively connected to the master cylinder through the check valve 12 and the spring container 17 in the second liquid-pressure control mechanism 2. Alternatively, the second liquid chambar 11 in the first liquid-pressure control mechanism 1 may communicatively be coupled with the master cylinder through only the first liquid cheer 10. In this case, the spring container 17 in the second liquid-pressure control mechanism 2 is coupled with the master cylinder by way of another pipe. The first liquid chamber may be replaced with another valve mechanism having a similar function, as a matter of course.

Further, the present invention is applicable not only to the antilock liquid-pressure control apparatus of the four-wheel independent type, but also the antilock liquid-pressure control apparatus of the 2-channel and 3-channel type. It is evident that the invention may variously be changed, modified and altered within the true spirits and scope of the invention.

In the antilock liquid-pressure control apparatus of the invention, there is no need of providing a high pressure accumulator and a pressure switch for monitoring a pressure in the accumulator in the apparatus. Further, no provision of a large size reservoir tank for holding brake liquid is required in an antilock liquid-pressure control circuit. Additionally, the held valve, which is indispensable for the conventional apparatus, is not needed for the construction of the apparatus. Accordingly, the antilock liquid-pressure control apparatus of the invention is small in size and low in weight. Since the accumulator and pressure switch, and the expensive hold valve are not used in the antilock liquid-pressure control apparatus, the cost to manufacture the apparatus is reduced. In the pressure reapplication mode of the antilock control, the brake liquid in the liquid chamber of the first liquid-pressure control mechanism is returned to the first liquid chamber of the first liquid-pressure control mechanism by way of the flow control valve. With this, a precise control of the pressure reapplication is secured.

What is claimed is:

1. An antilock liquid-pressure control apparatus comprising:

a first liquid-pressure control mechanism, an inner space thereof being partitioned into a first liquid chamber and a second liquid chamber by a piston;

a second liquid-pressure control mechanism, an inner space thereof being partitioned into a liquid chamber and a spring container by a piston;

wherein said second liquid chamber in said first liquid-pressure control mechanism is communicatively connected to a wheel cylinder and a pressure chamber of a master cylinder through a valve mechanism which closes a flow path only when an antilock control is executed, said first liquid chamber in said first liquid-pressure control mechanism is communicatively connected to a discharge port of a liquid pressure pump and said liquid chamber in said second liquid-pressure control mechanism through a flow control valve and further to a reservoir through a decay valve, and said spring container in said second liquid-pressure control mechanism communicates with said pressure chamber of said master cylinder, and wherein in a pressure reduction mode of said antilock control, brake liquid is sucked from said first liquid chamber by a liquid pressure pump, and said sucked brake liquid is accumulatively pressurized in said liquid chamber of said second liquid-pressure control mechanism, and said brake liquid is returned from said spring container to said master cylinder, and in a pressure reapplication mode of said antilock control, said brake liquid is supplied from said liquid chamber of said second liquid-pressure control mechanism to said first liquid chamber, through said flow control valve.

2. The antilock liquid-pressure control apparatus according to claim 1, wherein said flow control valve includes a sleeve having a side port comprising an opening and a valve body having an orifice and being slidable within said sleeve, wherein the area of the opening of said side port is varied with the movement of said valve body.

3. The antilock liquid-pressure control apparatus according to claim 2, wherein said flow control valve further includes a spring for urging one end of said valve body, said side port is connected to said first liquid chamber, and the other end of said valve body is connected to said discharge port of said liquid pressure pump.

* * * * *